(12) United States Patent
Shen

(10) Patent No.: US 9,428,153 B2
(45) Date of Patent: Aug. 30, 2016

(54) ENERGY-SAVING FRAMELESS WIPER

(76) Inventor: Xianbo Shen, Ningbo (CN)

( * ) Notice: Subject to any disclaimer, the term of this patent is extended or adjusted under 35 U.S.C. 154(b) by 136 days.

(21) Appl. No.: 14/130,425

(22) PCT Filed: Jun. 10, 2011

(86) PCT No.: PCT/CN2011/000971
§ 371 (c)(1),
(2), (4) Date: Dec. 31, 2013

(87) PCT Pub. No.: WO2012/167402
PCT Pub. Date: Dec. 13, 2012

(65) Prior Publication Data
US 2015/0232068 A1 Aug. 20, 2015

(30) Foreign Application Priority Data

Jun. 7, 2011 (CN) .......................... 2011 2 0188328

(51) Int. Cl.
*B60S 1/40* (2006.01)
*B60S 1/38* (2006.01)

(52) U.S. Cl.
CPC ............ *B60S 1/3879* (2013.01); *B60S 1/3851* (2013.01); *B60S 1/3858* (2013.01)

(58) Field of Classification Search
CPC B60S 1/3848; B60S 1/3849; B60S 1/34851; B60S 1/3858; B60S 1/381; B60S 1/3879; B60S 1/3874
See application file for complete search history.

(56) References Cited

U.S. PATENT DOCUMENTS

| | | | | |
|---|---|---|---|---|
| 3,192,551 A * | 7/1965 | Appel | ........................ | 15/250.43 |
| 3,725,971 A * | 4/1973 | Quinlan | ................... | B60S 1/38 |
| | | | | 15/250.32 |
| 4,063,328 A * | 12/1977 | Arman | ....................... | 15/250.43 |
| 7,540,062 B1 * | 6/2009 | Huang | ................... | B60S 1/381 |
| | | | | 15/250.201 |
| 8,327,498 B2 * | 12/2012 | Kim | ......................... | 15/250.201 |
| 8,533,897 B2 * | 9/2013 | Kim | ......................... | 15/250.201 |
| 8,839,482 B2 * | 9/2014 | Kim et al. | ................. | 15/250.32 |
| 2006/0026786 A1 * | 2/2006 | Ku | ............................. | 15/250.32 |
| 2007/0113367 A1 * | 5/2007 | Boland et al. | ........... | 15/250.201 |
| 2010/0257688 A1 * | 10/2010 | Huang | .................. | B60S 1/3858 |
| | | | | 15/250.32 |
| 2011/0041280 A1 * | 2/2011 | Choi | .................... | B60S 1/3858 |
| | | | | 15/250.361 |
| 2012/0102669 A1 * | 5/2012 | Lee et al. | ................. | 15/250.201 |

FOREIGN PATENT DOCUMENTS

KR 20080102564 A * 11/2008
WO WO2010/062125 A2 * 6/2010

* cited by examiner

*Primary Examiner* — Gary Graham
(74) *Attorney, Agent, or Firm* — Chieh-Mei Wang

(57) ABSTRACT

An energy-saving frameless wiper includes a connector, a steel sheet, a rubber strip, sealing strips, and a wiper head. The steel sheet is attached to the connector. Two ends of the steel sheet are sleeved by the sealing strips. The connector is connected to the wiper head. The steel sheet is an integrated structure, wherein a long groove is longitudinally arranged in the middle of the steel sheet. The long groove has an inlet opening on one end. The rubber strip is clipped in the long groove of the steel sheet. The wiper exerts even forces on glass, has an artistic appearance and curved shape, can effectively reduce the wind resistance and improves the effectiveness of rain wiping.

5 Claims, 3 Drawing Sheets

ENERGY-SAVING FRAMELESS WIPER

TECHNICAL FIELD

The present system relates to a wiper, and more particularly to an energy-saving frameless wiper.

BACKGROUND

The majority of wipers currently on the market use two steel sheets as the supporting structure for the rubber strip. Such designs are problematic because the curvatures of the two steel sheets and the pressure applied thereby cannot be made exactly the same. It leads to non-uniform pressure applied to the windshield glass and negatively affects the wiper's effectiveness. Additionally, the frame wiper currently on the market include sealing heads on both ends of the sealing strip, wherein the sealing head and sealing strip are separate structures. Such traditional designs not only affect the artistic appearance of the wiper, but also lead to greater wind resistance and decreased effectiveness.

SUMMARY

The present system is designed to provide a wiper that applies uniformed pressure on the windshield glass, has a stylish design, can effectively reduce wind resistance, and improves the overall effectiveness of rain wiping.

To achieve the above goals, the present system provides technical solutions as follows:

an energy-saving frameless wiper includes a connector, a steel sheet, a rubber strip, sealing strips, and a wiper head. The steel sheet is connected to the connector. Two ends of the steel sheet are sleeved by the sealing strips. The connector is connected to the wiper head. The steel sheet is an integrated structure, wherein a long groove is longitudinally arranged in the middle of the steel sheet. The long groove has an inlet opening on one end. The rubber strip is clipped in the long groove of the steel sheet;

wherein the steel sheet is riveted to the connector, wherein both outer ends of said steel sheet include a hook slot, said sealing strips include a corresponding structure that fits in said slot;

wherein said sealing strip is a one-piece structure;

wherein said wiper head is buckled to said connector.

wherein the windward side of said wiper head and said sealing strip include a streamlining curved surface.

wherein the rubber strip is extendable and elastic.

The present system improves on regular frameless wipers by converting a traditional structure of two steel sheets to a one steel sheet structure. The steel sheet in the present system is an integrated structure with a long groove longitudinally arranged in the middle. Such integral structure ensures uniform pressure on the glass. Another aspect of the present system is that it uses a one-piece sealing structure instead of separate sealing head and sealing strips. It provides a simplified and streamlined appearance. Both the sealing strip and wiper head includes a streamlining curved surface, which effectively reduces wind resistance, increases pressure on the glass surface, improves rain wiping, and therefore reduce the overall energy consumption. The wiper head and the connector are buckled together, which makes it easier and quicker for replacement or repair.

BRIEF DESCRIPTION

Figure 1:
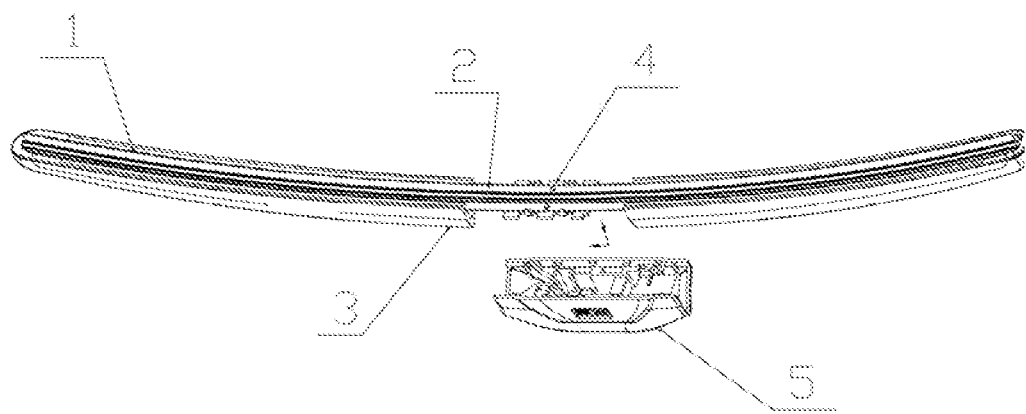
FIG. 1 is a schematic view of the present system.
Figure 2:
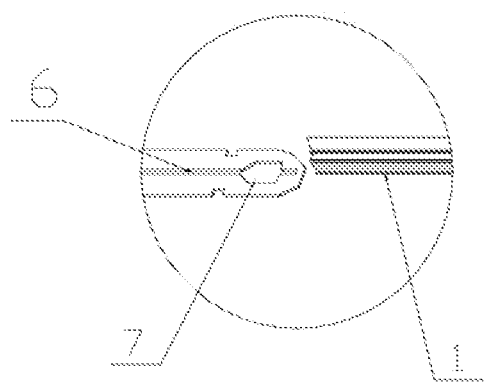
FIG. 2 is a schematic view of the inlet opening of the steel sheet in the present system.
Figure 3:
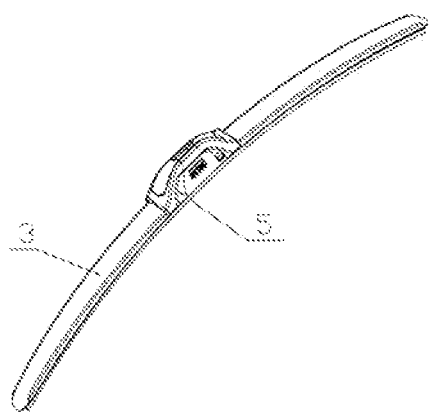
FIG. 3 shows the overall configuration of the sealing strip and wiper head design in the present system.
Figure 4:
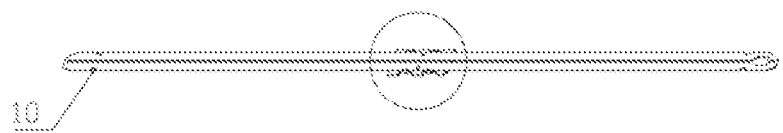
FIG. 4 is a schematic structural view of the steel sheet.
Figure 5:
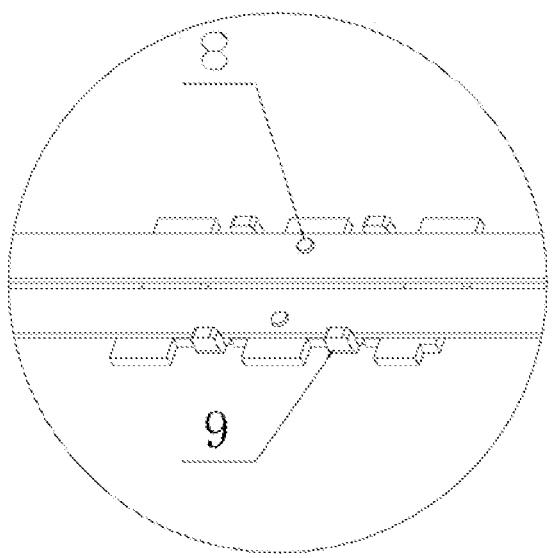
FIG. 5 shows the connection between the steel sheet and connector.

In the drawings: 1—rubber strips; 2—steel sheet; 3—sealing strip; 4—connector; 5—wiper head; 6—long groove in the steel sheet; 7—inlet opening; 8—riveting point; 9—positioning mark; 10—slot.

DETAILED DESCRIPTION

One of the preferred embodiment is an energy-saving frameless wiper that includes a connector, a steel sheet, a rubber strip, sealing strips, and a wiper head. The steel sheet is connected to the connector. Two ends of the steel sheet are sleeved by the sealing strips. The connector is connected to the wiper head. The steel sheet is an integrated structure, wherein a long groove is longitudinally arranged in the middle of the steel sheet. The long groove has an inlet opening on one end, through which the rubber strip is clipped in the long groove of the steel sheet. The steel sheet is riveted to the connector at two points. There are four positioning marks to ensure no relative movements between the steel sheet and connector. Both outer ends of said steel sheet include a slot, wherein said sealing strips include a corresponding structure that fits in said slot so that the sealing strip is fixed. The sealing strip is a one-piece structure. The windward side of said wiper head and said sealing strip include a streamlining curved surface. The wiper head is buckled to the connector. The rubber strip used in this embodiment is extendable and elastic.

While the invention has been particularly shown and described with reference to the preferred embodiment thereof, it will be understood by those skilled in the art that various modifications, additions and substitutions in form and detail may be made therein without departing from the spirit and scope of the invention, as set forth in the following claims.

What is claimed is:

1. An energy-saving frameless wiper comprising:
   a connector;
   a steel sheet;
   a rubber strip;
   a plurality of sealing strips; and
   a wiper head;
   wherein said steel sheet is attached to the connector, two ends of said steel sheet are sleeved by said sealing strips, and said connector is connected to the wiper head,
   wherein said steel sheet is an integrated structure, a long groove is longitudinally arranged in the middle of the steel sheet, said long groove has an inlet opening on one end, and said rubber strip is clipped in the long groove of said steel sheet,
   wherein the connector comprises two riveting points and a plurality of positioning marks, each of the two riveting points are disposed on one of two opposite sides of the long groove for joining the connector to the steel sheet, and the positioning marks discretely extends from the connector and are longitudinally spaced from the riveting points in two opposite directions along a length of the steel sheet for engaging outer edges of the steel sheet.

2. The wiper of claim 1 wherein both outer ends of said steel sheet include a hook slot, said sealing strips include a corresponding structure that fits in said hook slot.

3. The wiper of claim 1 wherein each of said sealing strips is a one-piece structure.

4. The wiper of claim 1 wherein said wiper head is buckled to said connector.

5. The wiper of claim 1 wherein a windward side of said wiper head and said sealing strips include a streamlining curved surface.

\* \* \* \* \*